J. A. WALKER.
Harrows.

No. 141,021.                    Patented July 22, 1873.

Witnesses
J. W. Sharpe
Wm. H. Morrow

Inventor
John A. Walker

UNITED STATES PATENT OFFICE.

JOHN A. WALKER, OF NASHVILLE, TENNESSEE, ASSIGNOR OF TWO-THIRDS HIS RIGHT TO J. M. SHARPE AND WM. H. MORROW, OF SAME PLACE.

IMPROVEMENT IN HARROWS.

Specification forming part of Letters Patent No. 141,021, dated July 22, 1873; application filed December 28, 1872.

*To all whom it may concern:*

Be it known that I, JOHN A. WALKER, of the city of Nashville, in the county of Davidson and State of Tennessee, have invented a new and useful Improvement in Harrows, of which the following is a specification:

The object of my invention is to procure a flexible harrow, and thereby overcome the chief difficulty in harrows now in use.

The nature of my invention consists in combining with an ordinary harrow-tooth a cross of four arms, capable of being connected by means of links with other similar crosses containing teeth, as hereafter described.

Figure 1:
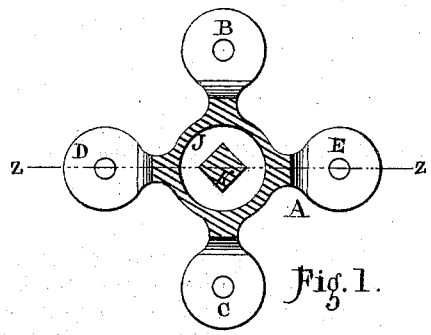
Figure 2:
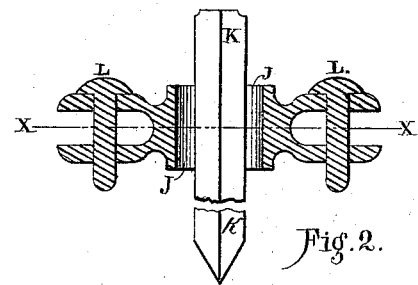
Figure 3:
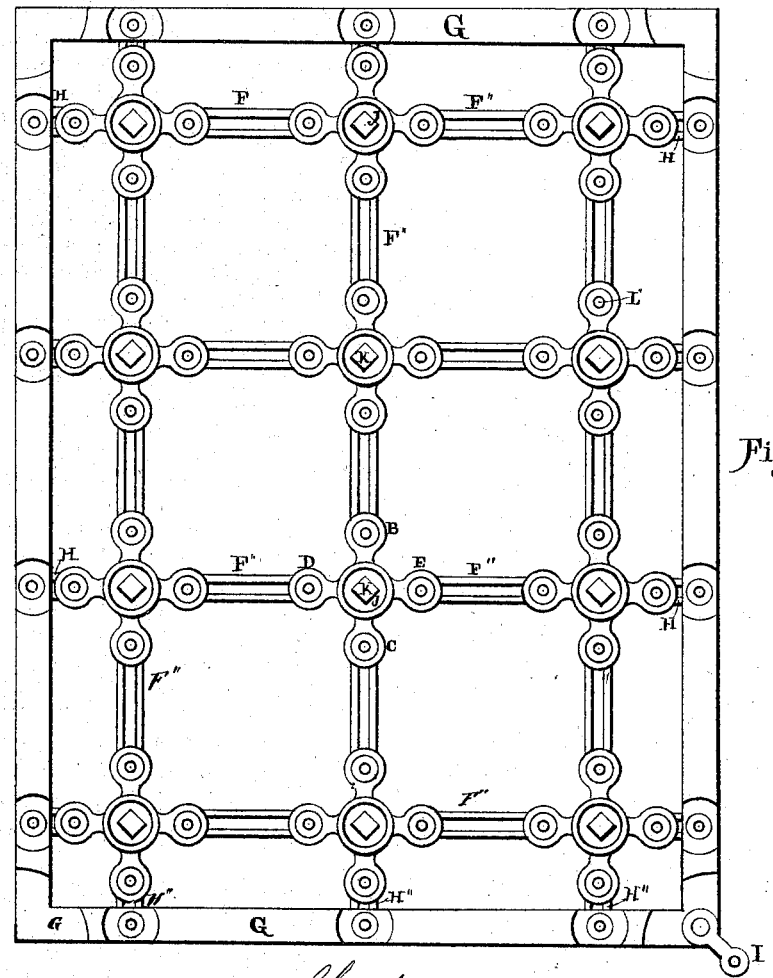

In the accompanying drawings, Figure 1 represents a cross-section through the line $xx$ of Fig. 2. Fig. 2 represents a vertical section of the cross and a portion of the tooth through the line $zz$ of Fig. 1. Fig. 3 is a top view of the entire implement embracing a number of the crosses combined, although this number may be increased to that of any number desired.

A is a cross of four arms, B, C, D, and E. F F'''' are links or chains leading from each of the said arms to arms of other crosses similar to cross A, and thus connected in a similar manner by pins L L''''', which pass through suitable holes with which the arms are provided, and through the said links, thus forming a flexible frame-work within the main frame G, to the inner side of which one arm of each of the crosses on the border of the series of crosses are attached by links H H'' '' into suitable staples, as shown in Fig. 3 of my drawing. The center of cross A is provided with an opening or space (either square, oval, or circular in form,) into which tightly fits a wooden ferrule, J, through which passes a harrow-tooth of ordinary construction, K.

The object of this part of the device is to provide an easy and positive means for fastening a harrow-tooth into an iron socket, though it may be here stated that the said ferrule may be dispensed with by making the opening in the cross of suitable dimensions to fit tightly to the tooth; or indeed it may be stated that the cross and tooth may be made all in one piece, of either wrought or cast iron, and that instead of a cross a circular flange provided with four holes pierced at proper intervals may be used, as my only object in the use of the cross or its equivalent, besides a connector, is to furnish sufficient horizontal bearing to prevent the tooth from falling too much out of a vertical line when the bottom of the same is being drawn through the earth by the forward progress of the implement.

The frame G, (which, as a matter of preference, is a wooden structure,) oblong in its shape, may be joined with one or more frames similar, containing similar frame-works of crosses, links, &c., with equally as good, if not better, effect than if used singly.

Although it is my intention to operate two or more of the frames in connection, I will complete this description with the use of but one to avoid complexity.

Supposing, then, a team of horses to be connected with the corner of the frame G at I, dragging the same over a plowed field, the result would be that the teeth K would at once assume an inclined position, pointing, as it were, toward the rear of the implement; at the same time they would rise or fall to accommodate an obstruction, rising above or sinking below the surface of the ground, and thereby practically pulverizing the earth, though the same may be at the commencement rough and uneven. Consequently I am enabled to perform with my implement this branch of farming more perfectly than with the harrow now in use.

What I claim as my invention, and desire to secure by Letters Patent of the United States, is—

The combination of cross A, ferrule J, tooth K, pins L L'''' '', links F F and H H'' '', and frame G, all as described and arranged for the purposes set forth in the above specification.

JOHN A. WALKER.

Witnesses:
J. M. SHARPE,
WM. H. MORROW.